United States Patent
Bosma et al.

(10) Patent No.: US 7,143,718 B2
(45) Date of Patent: Dec. 5, 2006

(54) ARRANGEMENT AND A METHOD FOR MILKING OF ANIMALS

(75) Inventors: Epke Bosma, Tumba (SE); Björn Johansson, Södertälje (SE)

(73) Assignee: DeLaval Holding AB, Tumba (SE)

( * ) Notice: Subject to any disclaimer, the term of this patent is extended or adjusted under 35 U.S.C. 154(b) by 46 days.

(21) Appl. No.: 10/489,194

(22) PCT Filed: Sep. 18, 2002

(86) PCT No.: PCT/SE02/01691

§ 371 (c)(1),
(2), (4) Date: Mar. 9, 2004

(87) PCT Pub. No.: WO03/024202

PCT Pub. Date: Mar. 27, 2003

(65) Prior Publication Data

US 2004/0244697 A1    Dec. 9, 2004

(30) Foreign Application Priority Data

Sep. 20, 2001    (SE) ................................. 01031384

(51) Int. Cl.
*A01J 3/00*     (2006.01)
*A01J 5/00*     (2006.01)
(52) U.S. Cl. ................. 119/14.02; 119/14.08
(58) Field of Classification Search ............. 119/14.02, 119/14.08, 14.18, 14.25
See application file for complete search history.

(56) References Cited

U.S. PATENT DOCUMENTS

| | | | | |
|---|---|---|---|---|
| 5,167,201 A | * | 12/1992 | Peles | 119/14.18 |
| 5,762,020 A | * | 6/1998 | van der Lely | 119/14.08 |
| 6,561,126 B1 | * | 5/2003 | Forsen et al. | 119/14.02 |
| 2002/0092474 A1 | * | 7/2002 | van der Lely et al. | 119/14.02 |
| 2003/0226511 A1 | * | 12/2003 | van den Berg et al. | 119/14.02 |

FOREIGN PATENT DOCUMENTS

| | | |
|---|---|---|
| EP | 0 385 539 | 2/1990 |
| EP | 0 516 246 | 2/1990 |
| EP | 0 399 604 | 5/1990 |
| EP | 0 628 244 | 6/1994 |
| WO | WO 01/19173 | 3/2001 |
| WO | WO01/19173 A1 * | 3/2001 |
| WO | WO 01/19175 | 3/2001 |

* cited by examiner

*Primary Examiner*—Teri Pham Luu
*Assistant Examiner*—Elizabeth Shaw
(74) *Attorney, Agent, or Firm*—Hovey Williams LLP

(57) ABSTRACT

The invention refers to an arrangement and a method for milking of animals. The arrangement includes a number of milking stations (1). Each milking station includes a set of teatcups to be attached to the animal to be milked, a local milk-collecting unit, a local milk discharge conduit (10) and a local feeding member. At least a first main milk conduit (31) is arranged to connect each local milk discharge conduit (10) to a central milk-receiving unit (30) for the transport of milk from each milking station (1) to the central milk-receiving unit. Each local feeding member is arranged to feed the milk by pressure from the local milk-collecting unit to the central milk-connecting unit via the local milk discharge conduit (10) and the first main milk conduit.

21 Claims, 3 Drawing Sheets

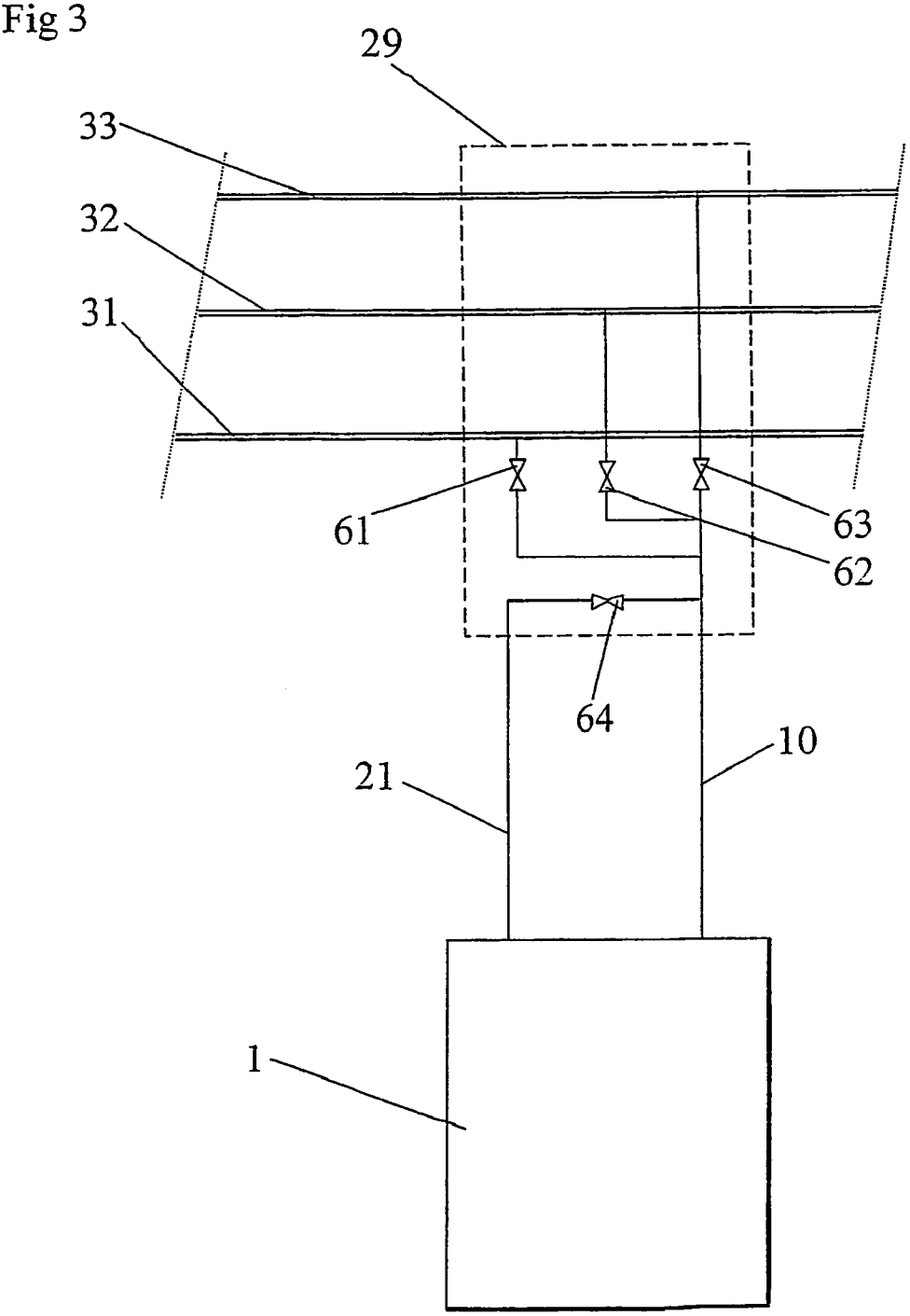

ARRANGEMENT AND A METHOD FOR MILKING OF ANIMALS

THE BACKGROUND OF THE INVENTION AND PRIOR ART

The present invention refers to an arrangement for milking of animals, including a number of milking stations, each milking station including a set of teatcups to be attached to the animal to be milked, a local milk-collecting unit, a local milk discharge conduit and a local feeding member; a central milk-receiving unit; and at least a first main milk conduit connectable to each local milk discharge conduit for the transport of milk from each milking station to the central receiving unit. The invention also refers to a method for milking of animals.

In big milking installations including a large number of milking stations, it is a difficult task to provide a proper transport of the milk to a common tank for storage and cooling of the milk. The milk delivery conduits have to be relatively long. Complex equipment is needed at the common milk storage and cooling tank in order to obtain a proper cleaning of the milking arrangement.

It is known to use the vacuum of a milking plant for transporting the milk to a milk-receiving unit. However, transporting milk by vacuum makes it necessary to provide a transport conduit that is filled by milk or any other liquid, such as washing liquid. The vacuum transport will not function when the conduit is not full across its diameter. It is also known to draw the milk by vacuum from a number of milking stations to a common milk line. The milk line is sloping to permit further transport of the milk to a releaser jar by means of gravity.

EP-A-516 246 discloses a milking arrangement including a number of milking stations and a central cooling tank for receiving and storing the milk extracted at the milking stations. The milking stations are connected to the cooling tank via a common re-circulation line. The milk is transported through the re-circulation line by means of a common pump.

SUMMARY OF THE INVENTION

The object of the present invention is to provide a simple and reliable transport of the milk from a number of milking stations to a common milk-receiving unit.

This object is obtained by the milking arrangement initially defined, which is characterised in that said local feeding member is arranged to feed the milk by pressure from the local milk-collecting unit to the central milk-receiving unit via the local milk discharge conduit and the first main milk conduit.

By feeding the milk in such a manner, a reliable and quick transport of the milk from each milking station to the single central receiving unit is achieved. The milk can be transported over relatively long distances without the need to avoid rising of the main milk conduit, which means that the milking stations can be located with less restrictions.

According to an embodiment of the invention, the arrangement includes a central washing plant and a main wash conduit for forming a conduit circuit of the first main milk conduit, the main wash conduit and the central washing plant. The central washing plant is arranged, during a central washing operation, to circulate a washing liquid through said conduit circuit. In such a manner, the main milk conduit may be effectively washed and cleaned.

According to a further embodiment of the invention, the arrangement includes a second main milk conduit connecting each local milk discharge conduit to the central milk-receiving unit. The arrangement is arranged to permit the transport of milk from each milking station to the central receiving unit via the first main milk conduit or the second main milk conduit by means of the respective local feeding member. Thereby, the arrangement may be arranged to permit simultaneously the central washing operation and said milk transport, wherein washing liquid is transported in the main wash conduit and one of the main milk conduits, and milk is transport in another one of the main milk conduits. Consequently, the milk transport does not have to be interrupted for the washing of the main milk conduits.

According to a further embodiment of the invention, the central washing plant includes a vacuum source arranged to provide at least partly said circulation of the washing liquid. By using a vacuum, or low pressure, for the transport of the washing liquid, an effective cleaning is obtained. Furthermore, by such a vacuum or low pressure transport of the washing liquid, a lower pressure will prevail in the conduits containing washing liquid than in the conduit containing milk. Consequently, washing liquid will be prevented from reaching the milk in case of a leakage, for instance at any valve device of the arrangement. Advantageously, the central washing plant may include a container forming a part of the conduit circuit, wherein the vacuum source is connectable to the container for providing said circulation through the conduit circuit and the container during the central washing operation.

Thereby, said central washing plant may include a pump arranged to lift the washing liquid from the container to the main wash conduit during the central washing operation, whereas the vacuum source is arranged to suck the washing liquid into the container from said main milk conduit.

According to a further embodiment of the invention, the central receiving unit includes a central milk tank arranged to collect and to store the milk from the milking stations. The central receiving unit may include a central divert container connectable to the main wash conduit and arranged to collect an initial quantity of milk produced during each milking operation in each milking station. Said local feeding member may be arranged to feed said quantity by pressure from the local milk-collecting unit to the central divert container via the main wash conduit. In such a way the fore milk or farm milk can easily be collected and separated from the milk to be delivered for consumption.

According to a further embodiment of the invention, each milking station is arranged to operate substantially completely independently of each of the other milking stations. This is advantageous in modern milking installations where the milking stations are visited by the animals on a voluntary basis. Thereby, each milking station may include a vacuum source arranged to provide a low pressure for extracting milk from the teats of an animal to be milked and for conveying the milk extracted to the local milk-collecting unit via said teatcups. Such a vacuum source may for instance be obtained by a local vacuum pump. However, the independence of the milking stations can also be maintained by a vacuum source in the form of a vacuum pump providing a low pressure for a number of milking stations.

According to a further embodiment of the invention, each milking station is arranged to permit automatic attachment of the teatcups to the teats of the animal to be milked, for instance by means of an automatic handling device. In such a way, the milking arrangement may be substantially fully automatic with regard to the handling of the equipment of the milking station during the milking procedure as well as the handling of the milk produced during the milking procedure.

According to a further embodiment of the invention, each milking station is connectable to the first main milk conduit and the second main milk conduit via a valve device. Furthermore, each milking station may be connectable to the main wash conduit via the valve device.

According to a further embodiment of the invention, each milking station includes a local washing plant for permitting a local washing operation of the teatcups and the local milk-collecting unit. Advantageously, the valve device is arranged to close the connection to said main milk conduit during said local washing operation. Furthermore, the local washing plant may include a washing conduit for forming a re-circulation circuit including the teatcups, the local milk-collecting unit and at least a part of the milk discharge conduit.

The object is also obtained by the method initially defiened, which includes the steps of:
  attaching teatcups to the teats of animals to be milked in said milking stations,
  milking said animals,
  collecting the milk in a local milk-collecting unit in each milking stations during milking of said animals, and
  feeding the milk by pressure from the local milk-collecting unit via a local milk discharge conduit and at least a first main milk conduit to the central milk-receiving unit.

Advantageous embodiments of the method are defiined in the dependent claims 19 to 21.

BRIEF DESCRIPTION OF THE DRAWINGS

The present invention will now be described more closely by means of the description of examples of various embodiments and with reference to the drawings attached.

FIG. 3 discloses more closely a valve device for the connection of a milking station to the milking arrangement.

DETAILED DESCRIPTION OF VARIOUS EMBODIMENTS OF THE INVENTION

Figure 1:
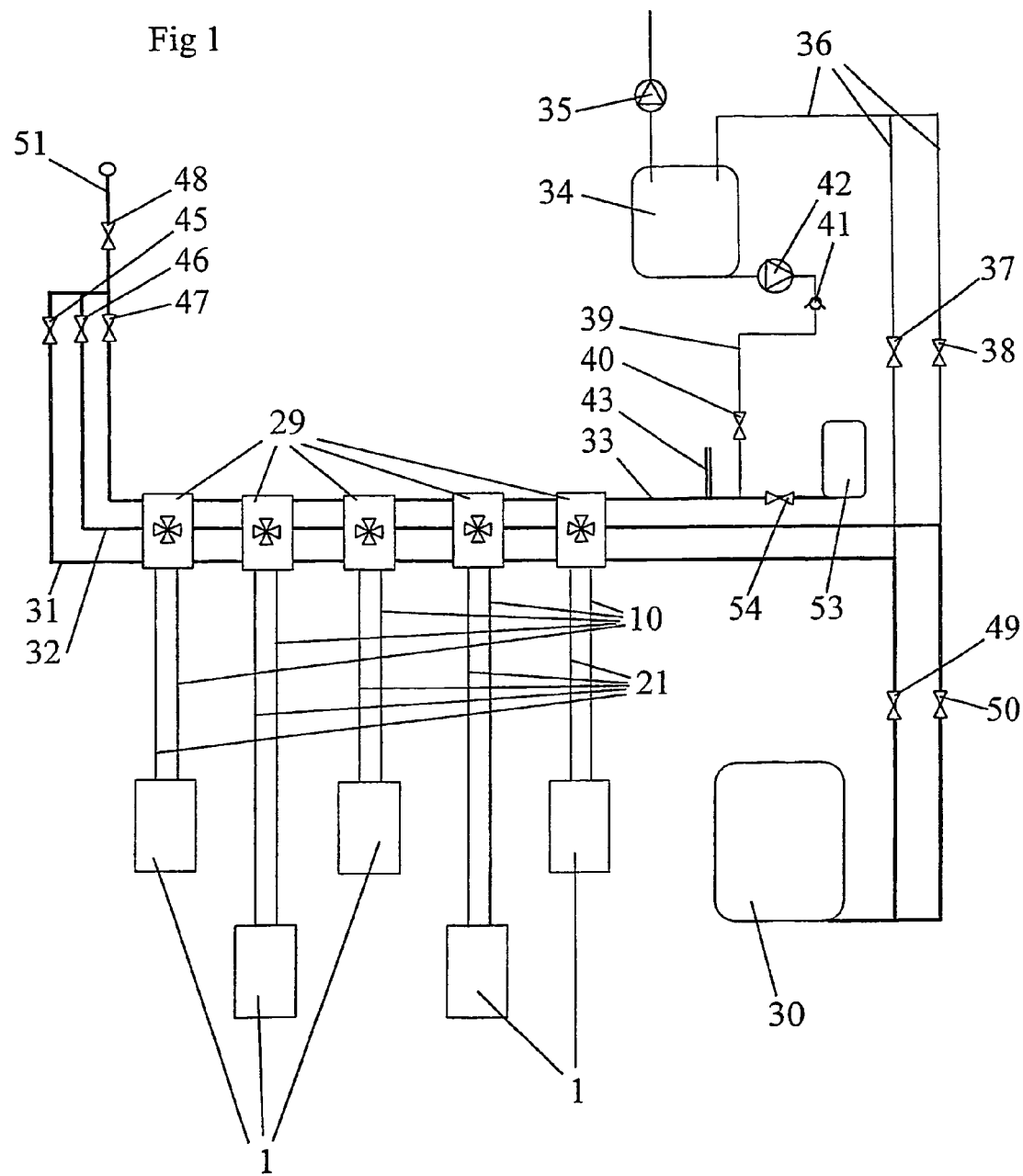
FIG. 1 discloses a schematic illustration of a milking arrangement according to an embodiment of the invention.
Figure 2:
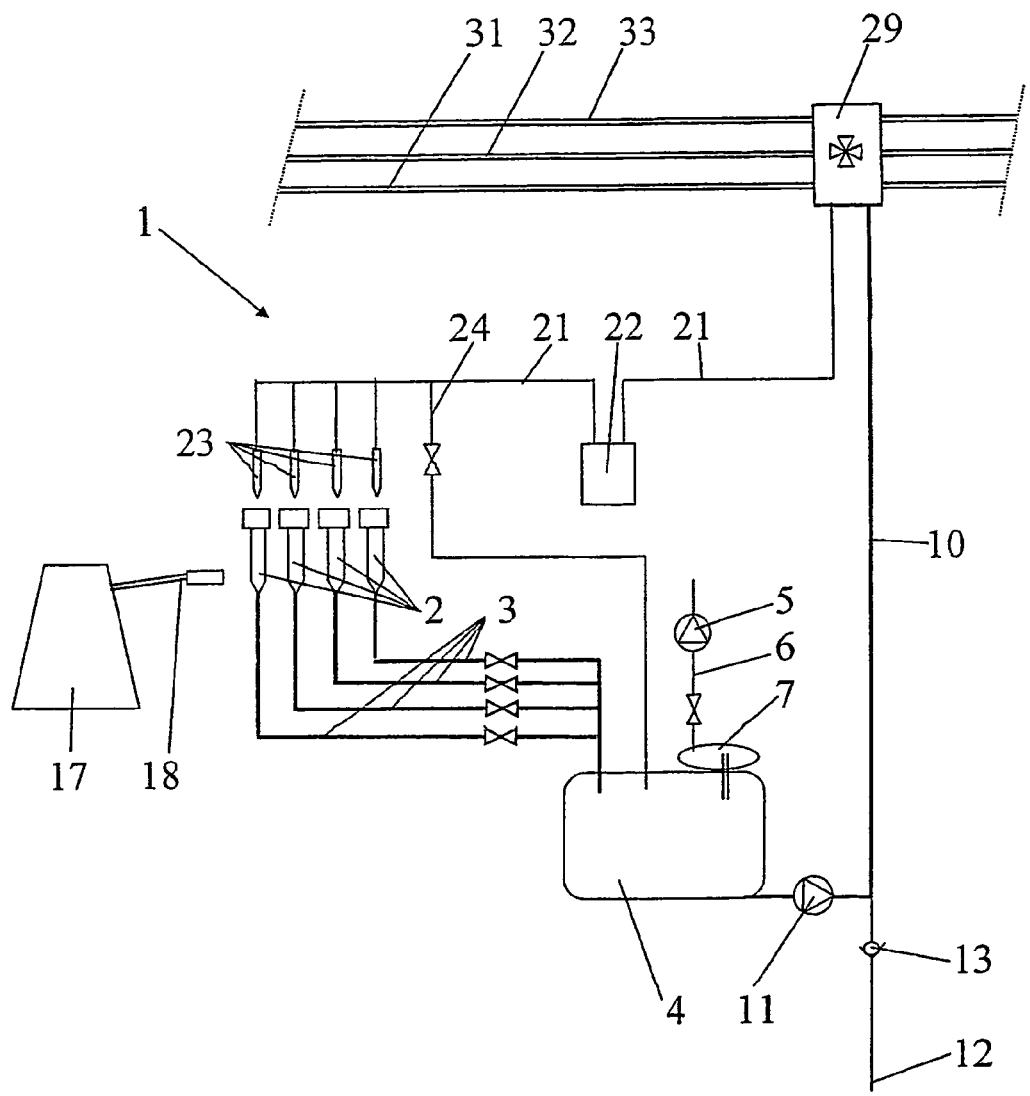
FIG. 2 discloses a schematic illustration of a milking station of the milking arrangement in FIG. 1.

FIG. 1 discloses a milking arrangement for milking of animals. The milking arrangement includes a number of milking stations 1, each being arranged for milking of at least one animal at a time. One such milking station 1 is disclosed more closely in FIG. 2. The milking station 1 includes a milking machine having a set of four teatcups 2 to be attached to the animal to be milked and four milk conduits 3 for conveying the milk extracted from the animal from the teatcups 2 to a local milk-collecting unit 4. A vacuum or low pressure is applied to the local milk-collecting unit 4 from a vacuum source. In the embodiment disclosed in FIG. 2, the vacuum source is a local vacuum pump 5, which is connected to the local milk-collecting unit 4 via a vacuum conduit 6 and a trap member 7 preventing milk from reaching the vacuum conduit 6 and the pump 5. By means of the vacuum pump 5, a vacuum, or a low pressure, is thus applied to the teatcups 2 in a conventional manner. It is to be noted, that the milking machine also includes means for providing a pulsating movement to teatcup liners (not disclosed) in the teatcups 2.

The milk extracted from the teatcups 2 is thus collected in the local milk-collecting unit 4. The milk contained in the milk-collecting unit 4 can be pumped away from the milking station 1 via a milk discharge conduit 10 by means of a local milk pump 11. In order to permit feeding of the milk through the milk discharge conduit 10, an air inlet 12 is provided in the proximity of the local milk pump 11. A one-way valve 13 is provided downstream of the air inlet to ensure that the milk is fed in the proper direction.

Furthermore, each milking station 1 includes an automatic handling device 17 arranged to attach in an automatic manner the teatcups 2 to the teats of the animal to be milked. The automatic handling device 17, which is schematically disclosed in FIG. 2, comprises a robot arm 18 for gripping and moving the teatcups 2. The automatic handling device 17 is also arranged to put the teatcups 2 in a washing position, in which the teatcups 2 may be washed during a local washing operation between two successive milking procedures.

In order to provide such a washing operation, each milking station 1 also includes a local washing plant for washing of the teatcups 2, the milk conduits 3, the local milk-collecting unit 4, the milk pump 11 and at least a part of the milk discharge conduit 10. The local washing plant includes a washing conduit 21, a washing machine 22 for the addition of washing liquid and any cleaning agents, and washing nozzles 23 to be introduced into the teatcups 2 for washing thereof. The washing plant also includes a washing line 24 for conveying washing liquid directly to the milk-collecting unit 4. Consequently, the washing conduit 21, the milk conduits 3, the milk-collecting unit 4, the washing line 24 and the milk discharge conduit 10 form a substantially closed re-circulation circuit.

Consequently, each milking station 1 includes all means necessary for performing milking of an animal and washing of the components included in the milking station 1. The milking stations 1 are thus provided to operate substantially completely independently of each other.

The milking arrangement, to which each milking station 1 is connected via a respective valve device 29, also includes a central milk-receiving unit for receiving the milk from each milking station 1. The central milk-receiving unit includes a central milk tank 30 arranged to collect and store the milk received. The milk tank 30 also has means for cooling the milk contained therein.

Furthermore, the milking arrangement includes at least a first main milk conduit 31 connectable, by means of the respective valve device 29, to each local milk discharge conduit 10 for the transport of milk from each milking station 1 to the central milk tank 30. Thereby, the milk is fed by pressure by the local milk pump 11 from the local milk-collecting unit 4 to the central milk tank 30 via the local milk discharge conduit 10 and the first main milk conduit 31. In the embodiment disclosed the milking arrangement also includes a second main milk conduit 32 extending in parallel with the first main milk conduit 31. Also the second main milk conduit 32 is connectable to each milking station 1 by means of the respective valve device 29. Consequently, the milking arrangement permits the transport of milk from each milking station 1 to the central milk tank 30 via the first main milk conduit 31 or the second main milk conduit 32 by means of the respective local milk pump 11.

The milking arrangement also includes a central washing plant and a main wash conduit 33 extending in parallel to the first main milk conduit 31 and the second main milk conduit 32. The central washing plant includes a container 34, which is arranged to receive and contain a washing liquid and which is connected to a vacuum source in the form of a vacuum pump 35. The container 34 is connectable via a washing line 36 either to the first main milk conduit 13 by means of a valve 37 or to the second main milk conduit 32 by means of a valve 38. The container 34 is also connected to the main wash conduit via a supply line 39 including a valve 40, a one-way valve 41 and a pump 42. Furthermore, the central washing plant includes an air inlet 43, permitting inlet of air to the main wash conduit 33.

A set of valves 45, 46, 47, 48, 49 and 50 are also provided for controlling the flow of milk and washing liquid during the milking and washing operations. The valve 45, arranged on the first main milk conduit 31, is closed during milk transport through the first main milk conduit 31 and open during washing thereof. The valve 46, arranged on the second main milk conduit 32, is closed during milk transport through the second main milk conduit 32 and open during washing thereof. The valve 47, arranged on the main wash conduit 33, is open during washing. The valve 48 is arranged on an air inlet conduit 51 and is open during washing to permit the suction of air into the main milk conduit 31, 32 to be washed. The valve 49, arranged on the first main milk conduit 31 in the proximity of the central milk tank 30, is open during milk transport through the first main milk conduit 31 but closed during washing thereof. The valve 50, arranged on the second main milk conduit 32 in the proximity of the central milk tank 30, is open during milk transport through the second main milk conduit 32 but closed during washing thereof.

The vacuum pump 35 is thus arranged to provide a circulation of the washing liquid through a substantially closed conduit circuit including the main wash conduit 33, one of the main milk conduits 31, 32 and the washing line 36. During washing air is intermittently sucked into said circuit via the air inlet 43 for forming slugs of washing liquid. The pump 42 is arranged to pump or lift the washing liquid sucked into the container 34 back to the main wash conduit 33 during the washing operation. Consequently, the arrangement permits the circulation of washing liquid through the main wash conduit 33 and one of the main milk conduits 31, 32, and the transport of milk to the central milk tank 30 through the other of the milk conduits 31, 32 to take place simultaneously.

Furthermore, the milking arrangement includes a central divert container 53, which is connected to the main wash conduit 33 via a valve 54. The divert container 53 is arranged to collect an initial quantity of milk produced during each milking operation in each milking station 1, the so called fore milk or farm milk. During the initial phase of each milking operation, the milk extracted from the animal is thus pump by means of the respective milk pump 11 to the central divert container 53 via the main wash conduit 33. It is to be noted that the divert container may also receive milk, which is not suitable for consumption for other reasons, for instance due to a high percentage of bacteria or other micro-organisms in the milk.

FIG. 3 discloses more closely one of the valve devices 29. Each valve device 29 includes a set of valves 61, 62, 63 and 64. The valve 61 is arranged to be open for permitting transport of milk from the local milk discharge conduit 10 to the first main milk conduit 31 and to be closed during washing of the first main milk conduit 31. The valve 62 is arranged to be open for permitting transport of milk from the local milk discharge conduit 10 to the second main milk conduit 32 and to be closed during washing of the second main milk conduit 32. The valve 63 is arranged to be open for permitting transport of the initial quantity of milk from the local milk discharge conduit 10 to the main wash conduit 33 and to be closed during washing of the main milk conduits 31, 32. The valve 64 is arranged to be open during the local washing operation for permitting transport of the washing liquid through the local milk discharge conduit 10 and the washing conduit 21 and to be closed during milk transport through the local milk discharge conduit 10.

The invention is not limited to the embodiments disclosed but may be varied and modified within the scope of the following claims.

For instance, it may be dispensed with the local washing unit in one or a number of the milking stations 1. Thereby, the washing liquid from the central washing plant may be conveyed through the milking station 1 via the washing conduit 21 and the local milk discharge conduit 10.

What is claimed is:

1. An arrangement for milking of animals, comprising:
   a number of milking stations, each milking station including a set of teatcups to be attached to the animal to be milked, a local milk-collecting unit, a local milk discharge conduit and a local feeding member;
   a central milk-receiving unit; and
   at least a first main milk conduit connectable to each local milk discharge conduit for the transport of milk from each milking station to the central receiving unit,
   wherein said local feeding member is arranged to feed the milk by pressure from the local milk-collecting unit to the central milk-receiving unit via the local milk discharge conduit and the first main milk conduit, and
   wherein the arrangement includes a second main milk conduit connecting each local milk discharge conduit to the central milk-receiving unit, wherein the arrangement is arranged to permit the transport of milk from each milking station to the central receiving unit via the first main milk conduit or the second main milk conduit by means of the respective local feeding member.

2. An arrangement according to claim 1, wherein the arrangement includes a central washing plant and a main wash conduit for forming a conduit circuit of the first main milk conduit, the main wash conduit and the central washing plant, wherein the central washing plant is arranged, during a central washing operation, to circulate a washing liquid through said conduit circuit.

3. An arrangement according to claim 2, wherein the central receiving unit includes a central divert container connectable to the main wash conduit and arranged to collect an initial quantity of milk produced during each milking operation in each milking station, wherein said local feeding member is arranged to feed said quantity by pressure from the local milk-collecting unit to the central divert container via the main wash conduit.

4. An arrangement according to claim 2, wherein the arrangement is arranged to permit the central washing operation to proceed simultaneously with said milk transport, wherein washing liquid is transported in the main wash conduit and one of the main milk conduits, and milk is transported in other one of the main milk conduits.

5. An arrangement according to claim 2 wherein the central washing plant includes a vacuum source arranged to provide at least partly said circulation of the washing liquid.

6. An arrangement according to claim 5, wherein said central washing plant includes a container forming a part of the conduit circuit, wherein the vacuum source is connectable to the container for providing said circulation through the conduit circuit and the container during the central washing operation.

7. An arrangement according to claim 6, wherein said central washing plant includes a pump arranged to lift the washing liquid from the container to the main wash conduit during the central washing operation, whereas the vacuum source is arranged to suck the washing liquid into the container from said main milk conduit.

8. An arrangement according to claim 1, wherein the central receiving unit includes a central milk tank arranged to collect and to store the milk from the milking stations.

9. An arrangement according to claim 1, wherein each milking station is arranged to operate substantially completely independently of each of the other milking stations.

10. An arrangement according to claim 9, wherein each milking station includes a vacuum source arranged to provide a low pressure for extracting milk from the teats of an animal to be milked and for conveying the milk extracted to the local milk-collecting unit via said teatcups.

11. An arrangement according to claim 1, wherein each milking station is arranged to permit automatic attachment of the teatcups to the teats of the animal to be milked.

12. An arrangement according to claim 1, wherein each milking station is connectable to the first main milk conduit and the second main milk conduit via a valve device.

13. An arrangement according to claim 12, wherein each milking station is connectable to the main wash conduit via the valve device.

14. An arrangement according to claim 12, wherein each milking station includes a local washing plant for permitting a local washing operation of the teatcups and the local milk-collecting unit and the valve device is arranged to close the connection to said main milk conduit during said local washing operation.

15. An arrangement according to claim 1, wherein each milking station includes a local washing plant for permitting a local washing operation of the teatcups and the local milking-collecting unit.

16. An arrangement according to claim 15, wherein the local washing plant includes a washing conduit for forming a re-circulation circuit including the teatcups, the local milk-collecting unit, and at least a part of the milk discharge conduit.

17. A method for milking of animals in a milking arrangement including a number of milking stations, the method including the steps of:
providing a first main milk conduit and a second main milk conduit,
attaching teatcups to the teats of animals to be milked in said milking stations, milking said animals,
collecting the milk in a local milk-collecting unit in each milking stations during milking of said animals, and
feeding the milk by pressure from the local milk-collecting unit via a local milk discharge conduit and via one of the first main milk conduit or alternatively the second main milk conduit to the central milk-receiving unit.

18. A method according to claim 17, including the further steps of:
providing a main wash conduit for forming a closed conduit circuit of the first main milk conduit, the main wash conduit and the central washing plant, and
circulating a washing liquid through said closed conduit circuit.

19. A method according to claim 18, including the simultaneous steps of:
transporting washing liquid in the main wash conduit and one of the main milk conduits, and
feeding milk in another one of the main milk conduits from at least one of said milking stations to the central milk-receiving units.

20. A method according the claim 18, including the step of:
applying a vacuum of low pressure to said main milk conduit for providing said circulation of washing liquid.

21. A method according to claim 18, including the step of:
feeding by pressure an initial quantity of milk produced during each milking operation in each milking station by the respective local feeding member from the local milk-collecting unit to a central divert container via the main wash conduit.

* * * * *